(12) United States Patent
Gravel

(10) Patent No.: US 12,515,606 B2
(45) Date of Patent: Jan. 6, 2026

(54) SLIDING DOOR PARTITION

(71) Applicant: RANGER DESIGN, Baie d'Urfe (CA)

(72) Inventor: Francois Gravel, Baie d'Urfe (CA)

(73) Assignee: RANGER DESIGN INC., Baie d'Urfé (CA)

( * ) Notice: Subject to any disclaimer, the term of this patent is extended or adjusted under 35 U.S.C. 154(b) by 556 days.

(21) Appl. No.: 18/069,460

(22) Filed: Dec. 21, 2022

(65) Prior Publication Data

US 2023/0202417 A1 Jun. 29, 2023

Related U.S. Application Data

(60) Provisional application No. 63/293,667, filed on Dec. 24, 2021.

(51) Int. Cl.
  *B60R 21/02* (2006.01)
  *B60J 5/00* (2006.01)
  *B60R 13/08* (2006.01)

(52) U.S. Cl.
  CPC ............ *B60R 21/026* (2013.01); *B60J 5/00* (2013.01); *B60R 13/08* (2013.01)

(58) Field of Classification Search
  CPC ........... B60R 21/026; B60R 13/08; B60J 5/00
  USPC ..................................................... 296/24.43
  See application file for complete search history.

(56) References Cited

U.S. PATENT DOCUMENTS

| | | | | |
|---|---|---|---|---|
| 1,263,895 A | * | 4/1918 | Hubbard | E05D 11/0054 312/328 |
| 1,444,398 A | * | 2/1923 | Shepherd | E06B 7/367 296/63 |
| 1,626,844 A | * | 5/1927 | Kuhn | B60J 5/0495 160/229.1 |
| 4,063,389 A | * | 12/1977 | Leder | E05B 65/0864 49/411 |
| 4,848,832 A | * | 7/1989 | Starnes | B60P 3/32 296/190.11 |
| 5,778,601 A | * | 7/1998 | Wu | E06B 7/367 49/383 |
| 6,298,605 B1 | * | 10/2001 | Delefosse | E06B 7/367 49/383 |
| 7,159,915 B2 | * | 1/2007 | Corey | B60N 2/24 296/64 |

(Continued)

FOREIGN PATENT DOCUMENTS

| | | | | |
|---|---|---|---|---|
| CN | 110884579 A | * | 3/2020 | B62D 33/04 |
| CN | 114312257 A | * | 4/2022 | E06B 7/28 |

(Continued)

*Primary Examiner* — Hilary L Gutman
(74) *Attorney, Agent, or Firm* — BCF LLP

(57) ABSTRACT

A vehicle partition assembly for installing in a vehicle. The assembly includes a partition configured to connect to an interior of the vehicle, the partition having an opening defined therein, and a door selectively moveable between at least an open position and a closed position. The door includes a door body slidably connected to the partition, and a door panel selectively moveable relative to the door body between at least an extended position and a retracted position. With the door in the closed position, the door panel is in extended position, and the door selectively closes the opening. With the door in the open position, the door panel is in the collapsed position, and the opening is uncovered to allow passage of a user therethrough.

16 Claims, 14 Drawing Sheets

(56) References Cited

U.S. PATENT DOCUMENTS

| | | | | |
|---|---|---|---|---|
| 2022/0282541 A1* | 9/2022 | Fabiano | ................ | E05D 15/063 |
| 2023/0272651 A1* | 8/2023 | Storck, III | .............. | E05D 15/08 |
| | | | | 49/478.1 |
| 2023/0272656 A1* | 8/2023 | Storck, III | ................ | E05F 5/06 |
| | | | | 296/24.3 |

FOREIGN PATENT DOCUMENTS

| | | | | | |
|---|---|---|---|---|---|
| CN | 116658022 A | * | 8/2023 | ................ | E05F 5/06 |
| CN | 116691578 A | * | 9/2023 | .............. | E05D 15/08 |
| DE | 19813670 C1 | * | 7/1999 | ............. | B60R 21/12 |
| DE | 102012022809 A1 | * | 5/2014 | ........... | B62D 33/042 |
| EP | 1035291 A1 | * | 9/2000 | ............ | E06B 7/367 |
| FR | 2933928 A1 | * | 1/2010 | ........... | B60R 21/026 |

* cited by examiner

SLIDING DOOR PARTITION

CROSS-REFERENCE

The present application claims priority to U.S. Provisional Patent Application No. 63/293,667, entitled "Sliding Door Partition", filed on Dec. 24, 2022, the entirety of which is incorporated by reference herein.

FIELD OF TECHNOLOGY

This invention relates generally to vehicle partitions and more particularly to vehicle partitions doors.

BACKGROUND

Vehicles with large, open interiors, such as vans, are often equipped or retrofitted with vehicle partitions, also referred to as separating walls or bulkheads. These configurations aid in limiting noise from transmitting to driver's compartment from the cargo area. These partitions also sometimes aid in separating environmental controls between the two areas, such as for limiting heating to the driver's compartment to conserve energy when heating is not need in the cargo area. Partitions may also be installed to prevent unintentional displacement of objects from the cargo area into the driver's compartment during operation of the vehicle.

Vehicle partitions are often equipped with doors to permit passage of people and/or objects between the driver's compartment and the cargo area. The size of the opening (and door) in such a partition can be limited by a variety of factors, including the shape and size of the space in which the door can move in order to open and close. Larger openings are generally preferred for ease of passage therethrough, while doors are preferably as small as possible due to the size constraints in the vehicle.

There therefore remains a desire for improvement to vehicle partitions.

SUMMARY

It is an object of the present technology to ameliorate at least some of the inconveniences present in the prior art.

According to aspects of the present technology, there is provided a vehicle partition assembly for selectively closing and opening a separation between two areas within a vehicle. The assembly includes a fixed partition with an opening in a center thereof and a door for selectively closing the opening. The door includes a pivoting panel in one corner. With the door in the open position, the panel is in a retracted position which exposes a contoured corner of the door body. The door body, specifically the contoured corner thereof, is shaped to accommodate the curved interior ceiling of the vehicle. By having a contoured corner, the general width of the door (and thus the opening) can be larger than a rectangularly shaped door (where the upper corner would limit the exterior movement of the door). When the door is in the closed position, with the door disposed over the opening, the panel is extended to complete a generally rectangular shape of the door, with the panel covering the portion of the opening that would be otherwise exposed by the contoured corner. In the closed position and the panel being extended, the door fully closes the opening, between for example the driver's compartment and the cargo area. This results in better separation between the driver's compartment and the cargo area. The benefits include better environmental control, making it easier to heat or cool the driver's compartment, and better noise control.

According to one aspect of the present technology, there is provided a vehicle partition assembly for installing in a vehicle, the assembly including a partition configured to connect to an interior of the vehicle, the partition having an opening defined therein; and a door selectively moveable between at least an open position and a closed position, the door including a door body slidably connected to the partition, and a door panel selectively moveable relative to the door body between at least an extended position and a retracted position, with the door being in the closed position: the door panel is in extended position, and the door selectively closes the opening, with the door being in the open position: the door panel is in the retracted (collapsed) position, and the opening is uncovered to allow passage of a user therethrough.

In some embodiments, the partition includes a first partition wall; and a second partition wall connected to the first partition wall; and the opening is defined between a first lateral edge of the first partition wall and a second lateral edge of the second partition wall.

In some embodiments, the partition further includes a top partition wall connected to and extending between the first partition wall and the second partition wall.

In some embodiments, the door panel is pivotally connected to the door body.

In some embodiments, the door panel pivots about a pivot point adjacent to an edge of the door body.

In some embodiments, the door panel pivots about a pivot point spaced from an edge of the door body.

In some embodiments, the door body has a slot defined therein; the door panel includes a rigid member extending from the door panel toward the door body; and the rigid member extends through the slot to guide pivoting motion of the door panel relative to the door body.

In some embodiments, when in use, the opening is disposed laterally between a driver seat of the vehicle and a passenger seat of the vehicle, the opening permitting passage of a user from a front portion of the vehicle to a rear portion of the vehicle.

In some embodiments, the opening is defined in a lateral center of the partition.

In some embodiments, the vehicle partition assembly further includes at least one rail guide slidably connecting the door body to the partition.

In some embodiments, the at least one rail guide includes an upper rail guide connecting an upper portion of the door body to the partition; and a lower rail guide connecting a lower portion of the door body to the partition.

In some embodiments, the vehicle partition assembly further includes a roller and track assembly connecting an upper portion of the door body to the partition; and the at least one rail guide connects a lower portion of the door body to the partition.

In some embodiments, a distance from a top corner of the opening to a lateral edge of the partition is less than a width of the opening.

In some embodiments, the door body comprises a window connected therein.

In some embodiments, the door panel includes a flange extending generally toward to the partition; and when in use and when the door is being moved from the open position to the closed position, contact between the flange and the partition cause the door panel to move from the retracted position to the extended position.

In some embodiments, when in use and when the door is being moved from the closed position to the open position, contact between the door panel and at least one of the vehicle and the partition cause the door panel to move from the extended position to the retracted position.

In some embodiments, the door is generally rectangular when in the closed position.

Should there be contradictions between the definitions of terms provided in documents incorporated herein by reference and definitions of such terms provided in the present application, the definitions in the present application prevail.

For purposes of this application, terms related to spatial orientation such as front, rear, top, bottom, left, and right, are as they would normally be understood by a driver of a vehicle sitting therein in a normal riding position. Terms related to spatial orientation when describing or referring to components or sub-assemblies of the vehicle, separately from the vehicle, should be understood as they would be understood when these components or sub-assemblies are mounted to the vehicle, unless specified otherwise in this application.

Embodiments of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of embodiments of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

It should be noted that, unless otherwise explicitly specified herein, the drawings are not necessarily to scale.

DETAILED DESCRIPTION

The present technology describes a vehicle partition assembly 100 for use in a vehicle (not shown). The vehicle partition assembly 100 separates areas within the vehicle from one another, commonly to separate the driver's compartment, also referred to as the cab area, from the cargo area of a vehicle. It is contemplated that other types of vehicles could implement the present technology.

As will be described in more detail below, the vehicle partition assembly 100 is configured and arranged to selectively open to allow occupants in the driver's compartment to access the cargo area when desired and to selectively fully close to separate the driver's compartment and the cargo area.

Figure 1:
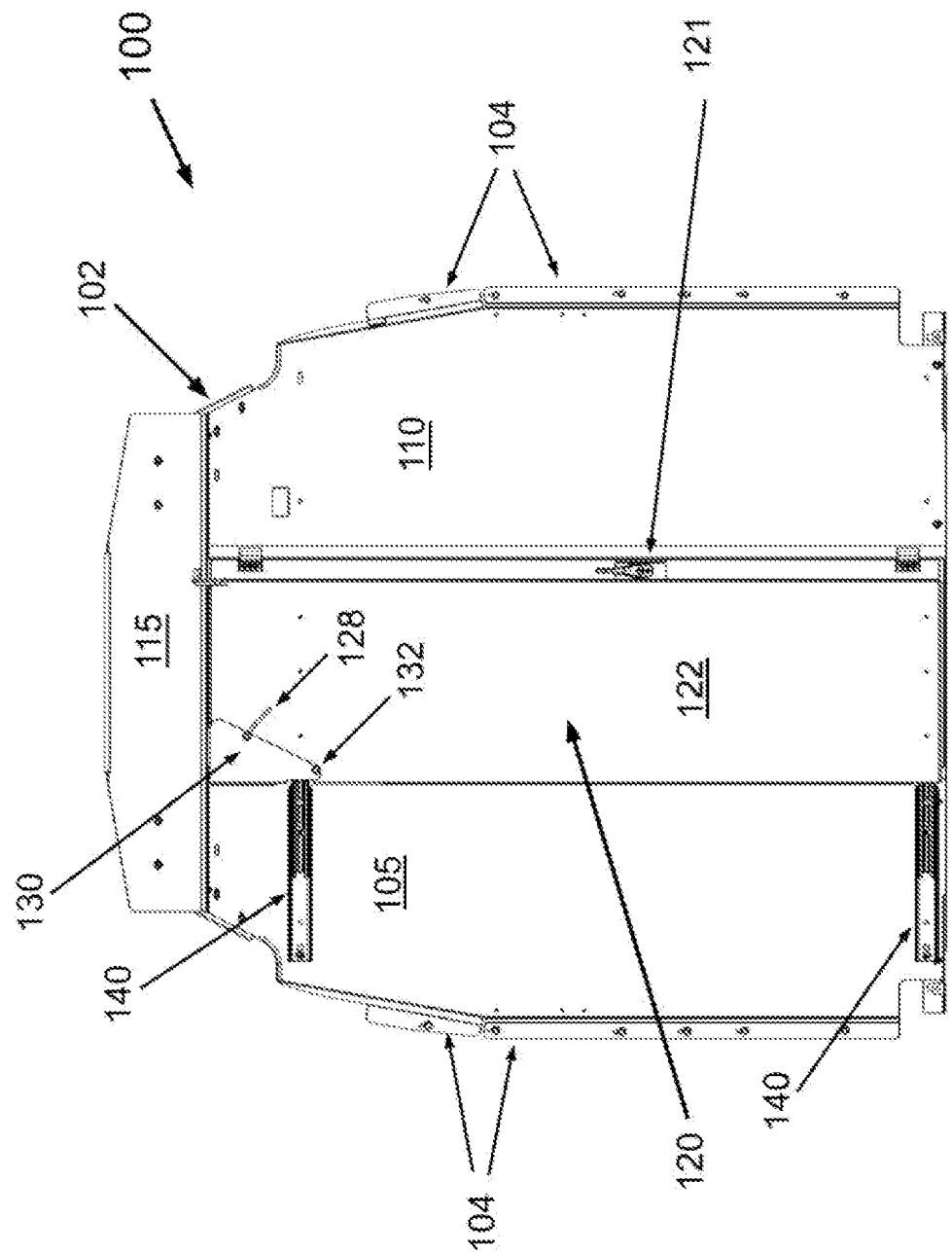
FIG. 1 is a rear elevation view of a vehicle partition assembly according to one non-limiting embodiment of the present technology.
Figure 2:
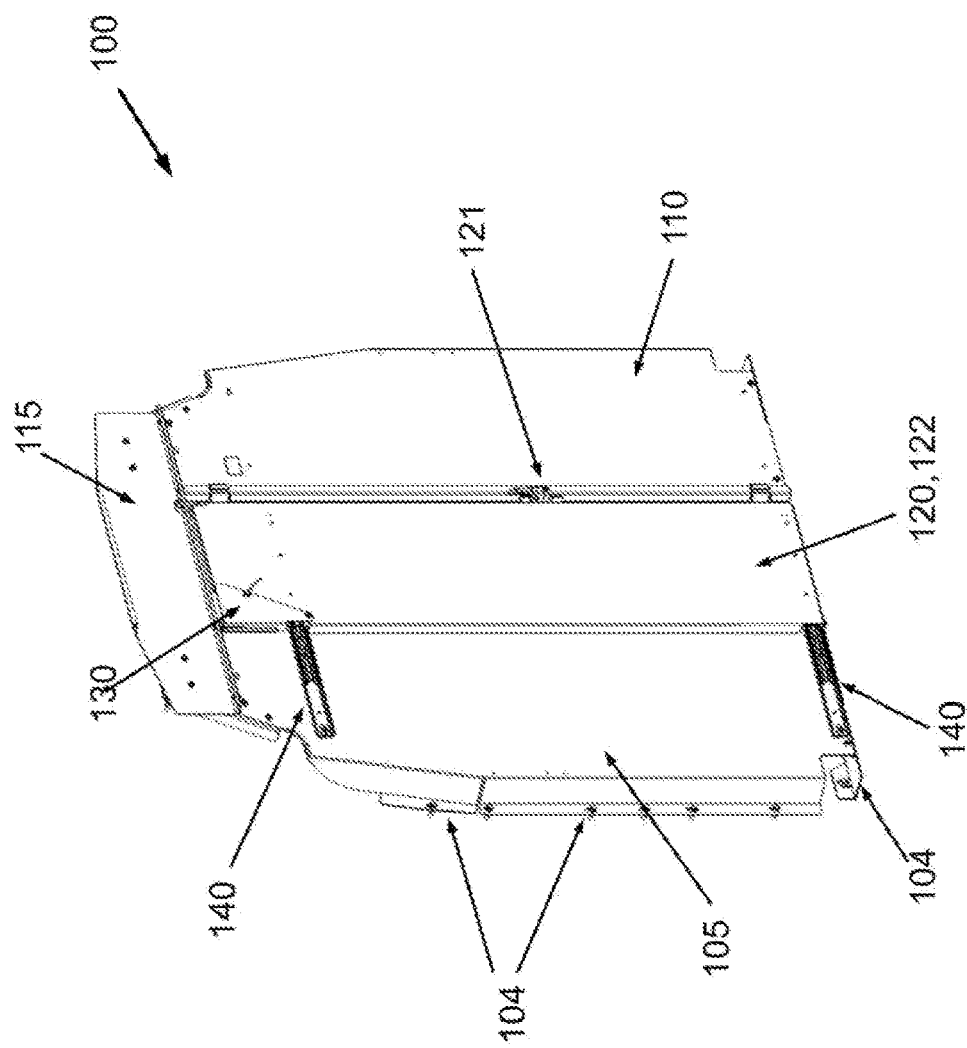
FIG. 2 is a rear, side perspective view of the vehicle partition assembly of FIG. 1, with a door of the assembly being in a closed position.
Figure 3:
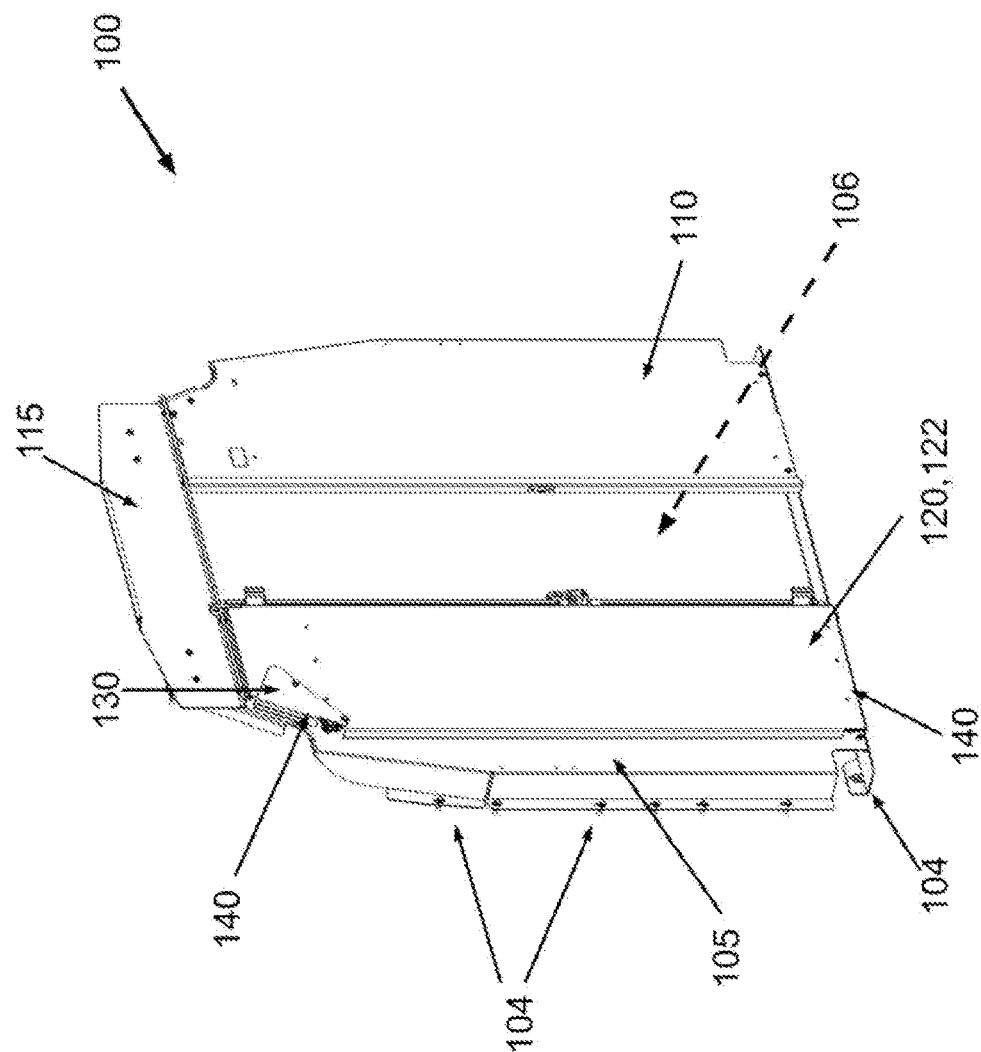
FIG. 3 is the rear, side perspective view of the vehicle partition assembly of FIG. 2, with the door of the assembly being in an open position.

A first non-limiting embodiment of the vehicle partition assembly 100 is illustrated in FIGS. 1 to 3. The vehicle partition assembly 100, also referred to as a sliding door partition 100 or an assembly 100 herein, is configured to be connected to an interior of the vehicle.

The assembly 100 includes a partition 102 configured to connect to an interior of the vehicle. The partition 102, when in use, is rigidly fixed to the interior of the vehicle. The partition 102 includes a left partition wall 105, disposed on a left side of the vehicle when in use, and a right partition wall 110, disposed on a right side of the vehicle when in use. The left and right walls 105, 110 are connected together to form, at least in part, the rigid structure of the partition 102. In the illustrated embodiment, the partition 102 also includes a top partition wall 115 connected to and extending between the left and right partition walls 105, 110. The walls 105, 110, 115 are generally shaped and arranged to fit the contours of the interior walls of the vehicle.

The partition 102 includes a series of flanges 104 disposed along an outer contour of the partition 102 for fastening the partition 102 to the interior of the vehicle. In addition to providing apertures (not separately identified) for engaging fasteners for connecting to the vehicle, the flanges 104 further aid in limiting noise transfer from the rear portion of the vehicle, as the flanges 104 are shaped to contour and cover the space between the generally planar walls 105, 110, 115 and the interior vehicle surface.

The partition 102 defines an opening 106 therein to allow a user of the vehicle (i.e. a driver and/or a passenger) to pass between the two portions of the vehicle separated by the partition assembly 100. The opening 106 is defined between one lateral edge of the wall 105 and another lateral edge of the wall 110. In the illustrated embodiment, a top of the opening 106 is defined by the wall 115 as well. In the embodiment of FIGS. 1 to 3, the opening 106 is defined in a lateral center of the partition 102. When in use, with the assembly 100 installed in the vehicle, the opening 106 is disposed laterally between a driver seat and a passenger seat of the vehicle (not shown). This placement of the opening 106 permits passage of a user (driver or passenger) from a front portion of the vehicle to a rear portion of the vehicle by passing between the driver and passenger seats. As will be described, the opening in different embodiments need not be completely centered in the partition.

The vehicle partition assembly 100 includes a sliding door 120, also referred to as the door 120. The door 120 is moveably connected to the partition 102, specifically slidably connected thereto. In the illustrated embodiment, the door 120 is mounted on two rail guides 140 connected to the partition 102. One rail guide 140 is supports an upper portion of the door 120, with the other rail guide 140 supporting a lower portion of the door 120. The door 120 is selectively moveable between a closed position (FIGS. 1, 2, 4) and an open position (FIGS. 3, 5). In the closed position, the door 120 closes the opening 106, impeding passage of people and objects through the opening 106, as well as limiting noise transmission therethrough. In the open position, the door 120 overlaps the wall 105 while leaving the opening 106 uncovered, permitting the passage of people and objects therethrough. In at least some embodiments, the door 120 could also be positionable at any number of positions intermediate to the closed position and the open position.

The door 120 includes a door body 122 slidably connected to the partition 102. The majority of the door 120 is formed by the door body 122. The door body 122 is generally flat, rigid and planar. The door body 122 could be formed from a variety of materials, including but not limited to steel sheet metal, aluminum sheet metal, and composite plastic materials. Depending on the embodiment, the door body 122 could be formed by more than one piece and/or multiple materials. The door body 122 includes a door handle 121 for selectively opening a latch (not shown) which selectively maintains the door 120 in the closed position. In at least some embodiments, the same or different latch could be used to maintain the door 120 in the open position. Different mechanisms for locking the door 120 in place are contemplated.

The door 120 also includes a door panel 130 connected to and selectively moveable relative to the door body 122. The panel 130 is moveable between at least an extended position (FIGS. 1, 2, 4) and a retracted position (FIGS. 3, 5). With the door 120 in the closed position, the door panel 130 is in the extended position and the door 120 selectively closes the opening 106. With the door 120 being in the open position, the door panel 130 is in the retracted position and the opening 106 is uncovered to allow passage of the user therethrough. Broadly, the panel 130 serves to selectively cover a cut-away of the door body 122, defined by an edge 123 (see FIGS. 6, 7). The panel 130 and the door body 122 thus form a generally rectangular door shape in the closed position, while revealing the cutaway in the open position of the door 120. Details of use of the panel 130 is described in more detail below.

The door panel 130 is more specifically pivotally connected to the door body 120. The panel 130 pivots about a pivot point 132, disposed in a bottom portion of the panel 130. In the illustrated embodiment, the pivot point 132 is formed by a fastener connecting the panel 130 to the door body (a nut and bolt in the present case), although different pivot mechanisms are contemplated. In the present embodiment, the pivot point 132 is disposed adjacent to the cutaway edge 123 of the door body 122. The specific position of the pivot of the panel 130 could vary, including as described below with respect to another embodiment.

Figure 6:
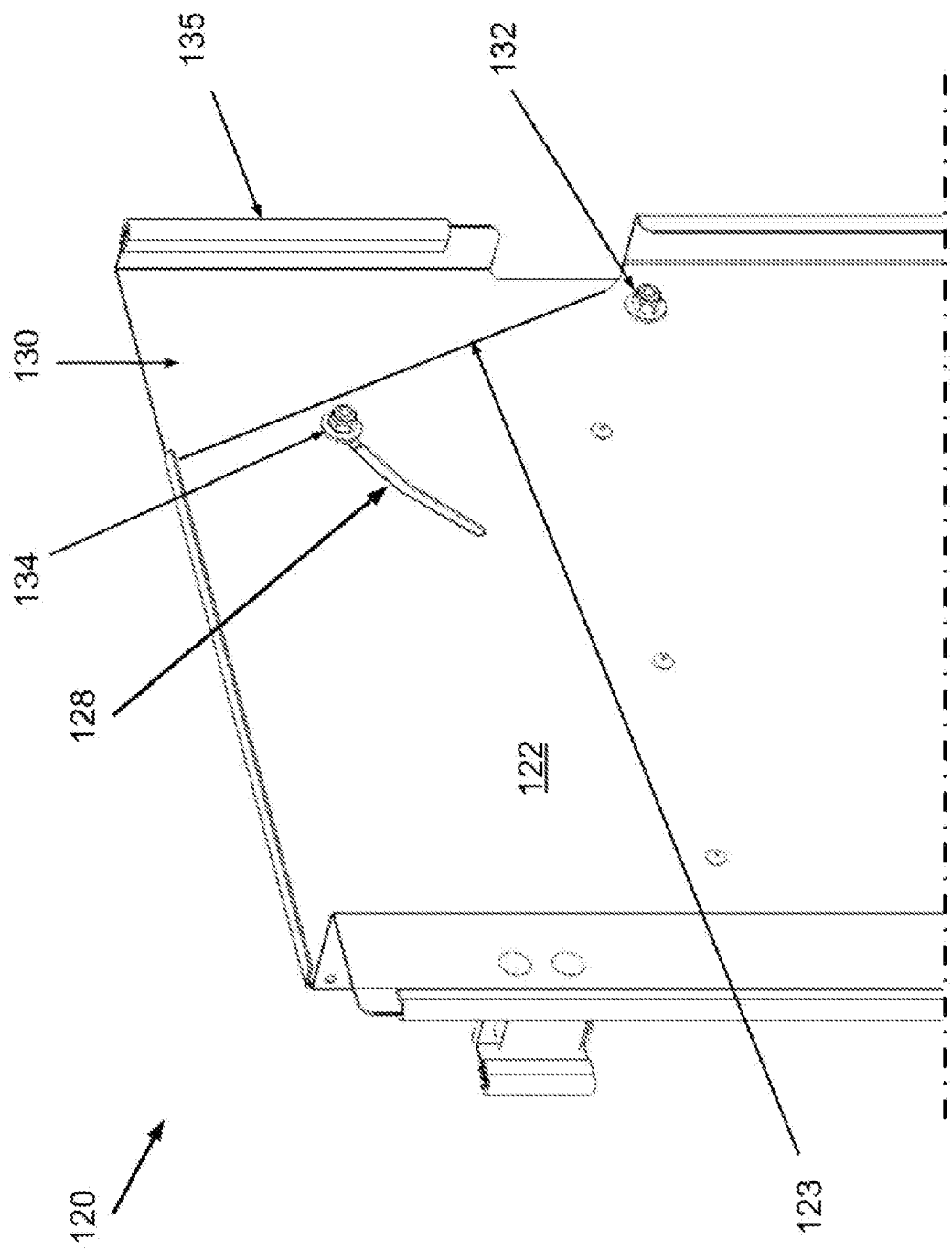
FIG. 6 is a front, side perspective view of the door of the vehicle partition assembly of FIG. 1, with a door panel of the door being in an extended position.
Figure 7:
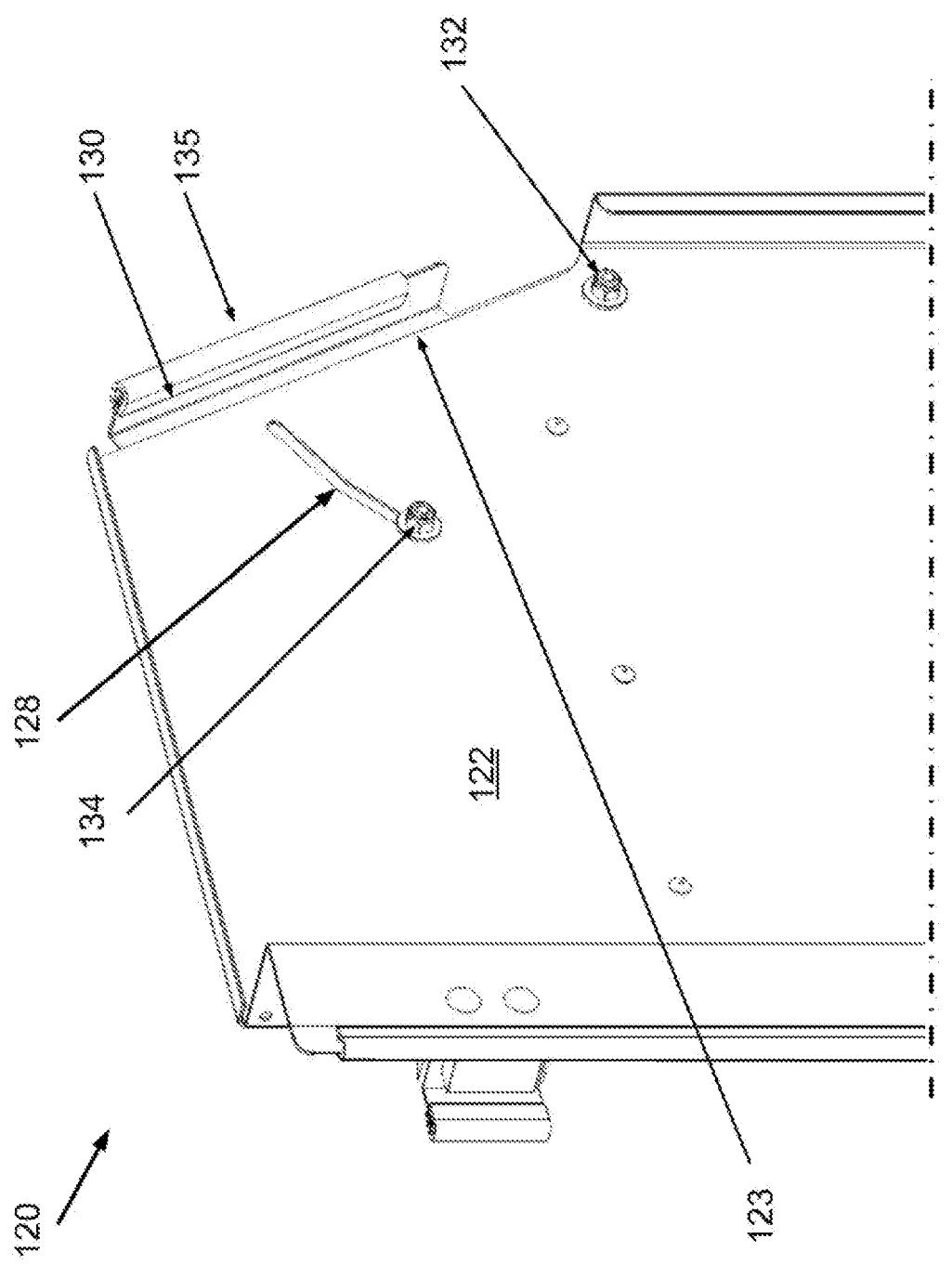
FIG. 7 is the front, side perspective view of the door of the vehicle partition assembly of FIG. 6, with the door panel being in a retracted position.

With additional reference to FIGS. 6 and 7, the door body 122 has a slot 128 defined therein to aid in guiding movement of the panel 130. The door panel 130 includes a rigid member 134 extending from the door panel 130 toward the door body 122 and through the slot 128. In the illustrated case the member 134 is a fastener (bolt and nut) 134, but other rigid members are contemplated. With the fastener 134 extending from the panel 130 and through the slot 128, pivoting motion of the door panel 130 relative to the door body 122 is guided along the path of the slot 128. The slot 128 is generally arcuate to follow the pivoting motion of a rigid body about one fixed pivot point, although different arrangements could be contemplated. In some embodiments, including as described in more detail below, the slot 128 and member 134 could be omitted.

The door panel 130 also includes a flange 135 extending generally toward to the partition 102. The flange 135 is disposed along an exterior edge of the panel 130 (opposite the door body 122) and is arranged generally perpendicular to the face of the panel 130. When the assembly 100 is in use, installed in the vehicle, the flange 135 serves to bring the panel 130 from the retracted position to the extended position, as will be described below.

Figure 4:
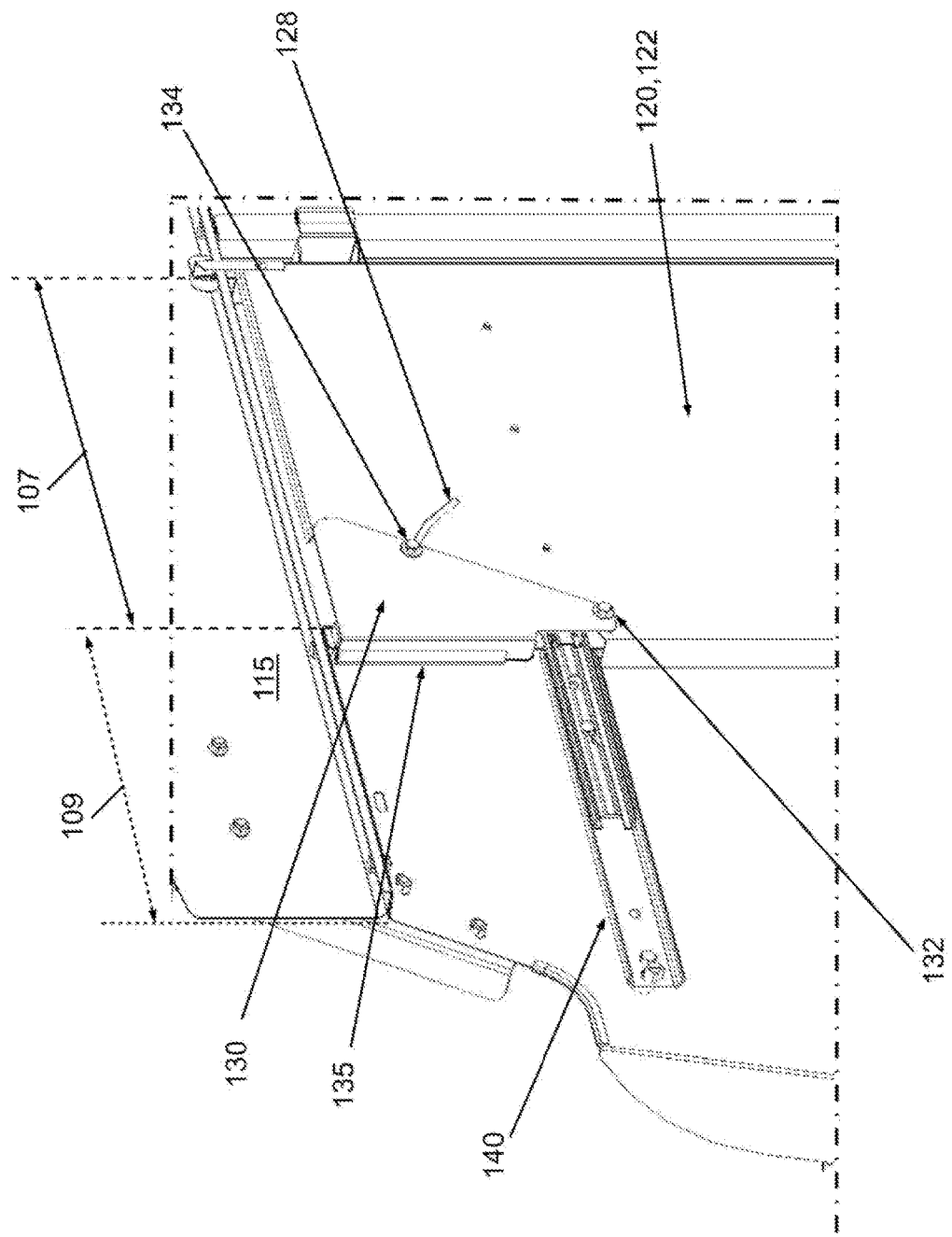
FIG. 4 is a close-up, partial view of the vehicle partition assembly of FIG. 1, with the door being in the closed position.
Figure 5:
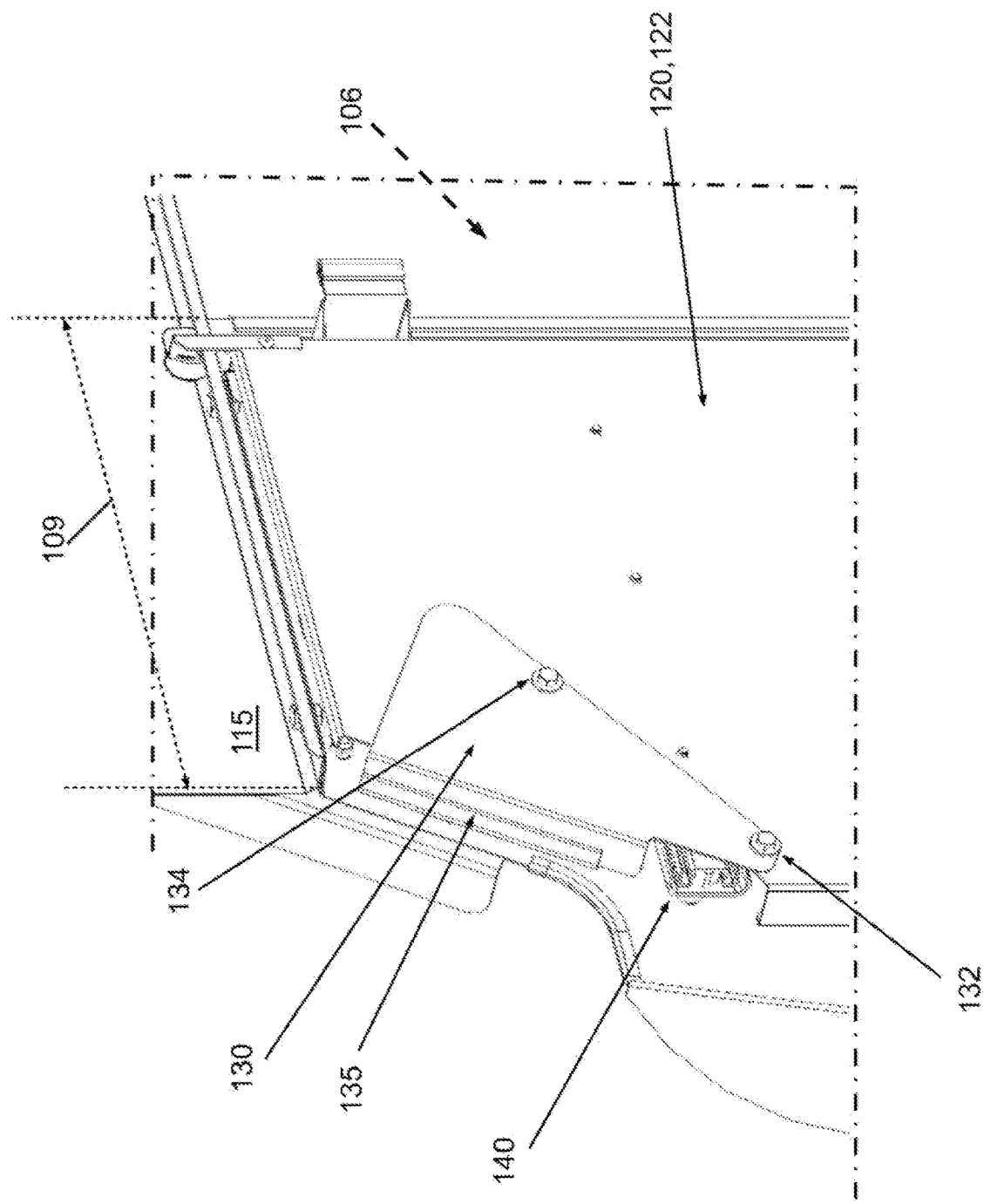
FIG. 5 is a close-up, partial view of the vehicle partition assembly of FIG. 1, with the door being in the open position.

As is mentioned briefly above and with continued reference to FIGS. 4 and 5, the door panel 130 serves to selectively cover a cutaway portion of the door body 122. More specifically, the door panel 130 permits an upper portion of the door 120 to adapt to different size requirements in the open and closed positions of the door 120. In the illustrated embodiment, this adaptation is highlighted by the difference between the space available to the door 120 along a top portion of the partition 102 as compared to the opening 106. Specifically, a distance 109 from a top corner of the opening 106, specifically the left, top corner in the present embodiment, to a lateral exterior edge of the partition 102 is less than a width 107 of the opening 106. As the assembly 100 is configured and arranged to be installed in a van-type vehicle, the partition 102 must be narrower along the top in order to accommodate the generally rounded ceiling of such vehicles. With a standard rectangular door of the prior art, the door could only slide as far as the top distance from the opening to the narrowest portion of the ceiling, thus limiting the size of the door and the corresponding opening.

As is illustrated in FIG. 5, however, the door panel 130 retracts to reveal the cutaway corner of the door body 122, which allows the door body 122 to slide farther from the center of the partition 102 than would otherwise be possible, thereby permitting a wider opening 106. In the illustrated example, the opening width 107 is on the order of 21 or 22 inches wide. Without the additional movement permitted by the panel 130, the opening for a similar construction would be closer to 16 or 17 inches wide. It is noted that in some cases the opening 106 may be wider than the space between the driver seat and the passenger seat; the additional space remains advantageous, as it provides additional space for movement in upper portions of the opening 106, such as for passing objects and provides additional shoulder space for users passing therethrough. While this extended opening could be accomplished by simply cutting away the corner of the door, the extension of the panel 130 provides for a full, generally rectangular door 120 when in the closed position, thereby not losing the object-obstruction, noise-reduction, and environmental separation advantages of having full coverage of the opening 106 when the door 120 is closed.

Generally, when the door 120 is moved from the closed position to the open position, contact between the door panel 130 and either the vehicle and/or the partition causes the door panel 130 to move from the extended position to the retracted position. For example, the flange 135 could abut the vehicle wall or ceiling, thereby pushing the panel 130 into the retracted position. When the door 120 is moved from the open position to the closed position, contact between the flange 135 and the partition 102 cause the door panel 130 to move from the retracted position to the extended position. In the present embodiment, friction between an edge of the flange 135 and the surface of the partition 102 cause drag on the panel 130 as the door 120 is moved toward the closed position, causing the panel 130 to pivot out to the extended position. In at least some embodiments, it is contemplated that the partition 102 could include a fixed, rigid member (for example, a small post) against which the flange 135 could abut when the door 120 is near the closed position, thereby causing the panel 130 to pivot out to the extended position.

Another embodiment of a vehicle partition assembly 200 according to the present technology is illustrated in FIGS. 8 to 14. Elements of the assembly 200 that are similar to those of the assembly 100 retain the same reference numeral and will generally not be described again.

The assembly 200 includes a partition 202 configured to rigidly connect to the interior of the vehicle. The partition 202 includes a left partition wall 205, disposed on a left side of the vehicle when in use, and a right partition wall 210, disposed on a right side of the vehicle when in use. The left and right walls 205, 210 are connected together to form, at least in part, the rigid structure of the partition 202. In the illustrated embodiment, the left and right partition walls 205, 210 are connected together with frame members 203 at a top and bottom of the partition 202. The walls 205, 210 are generally shaped and arranged to fit the contours of the interior walls of the vehicle. In the present embodiment, the walls 205, 210 generally extend from floor to ceiling within the vehicle interior.

The partition 202 includes a series of flanges 204 disposed along an outer contour of the partition 202 for fastening the partition 202 to the interior of the vehicle. The partition 202 further includes edge portions 208 extending outward from the walls 205, 210 to extend the partition 202 laterally outward from the walls 205, 210. In addition to providing apertures (not separately identified) for engaging fasteners for connecting to the vehicle, the flanges 204 and the edge portions 208 further aid in limiting noise transfer from the rear portion of the vehicle, as the flanges 204 and the edge portions 208 are shaped to contour and cover the space between the generally planar walls 205, 210 and the interior vehicle surface.

Figure 8:
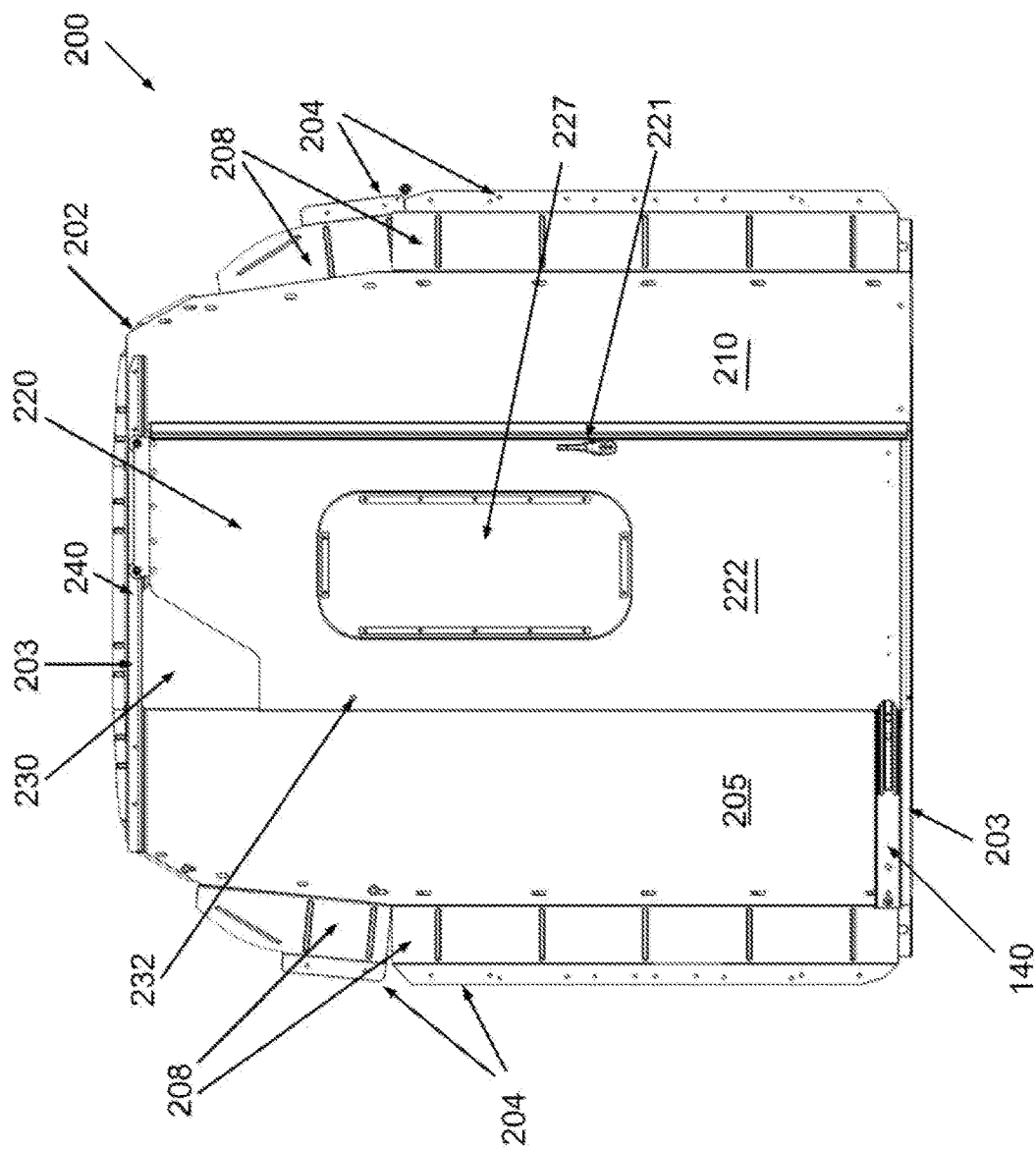
FIG. 8 is a rear elevation view of a vehicle partition assembly according to another non-limiting embodiment of the present technology.
Figure 9:
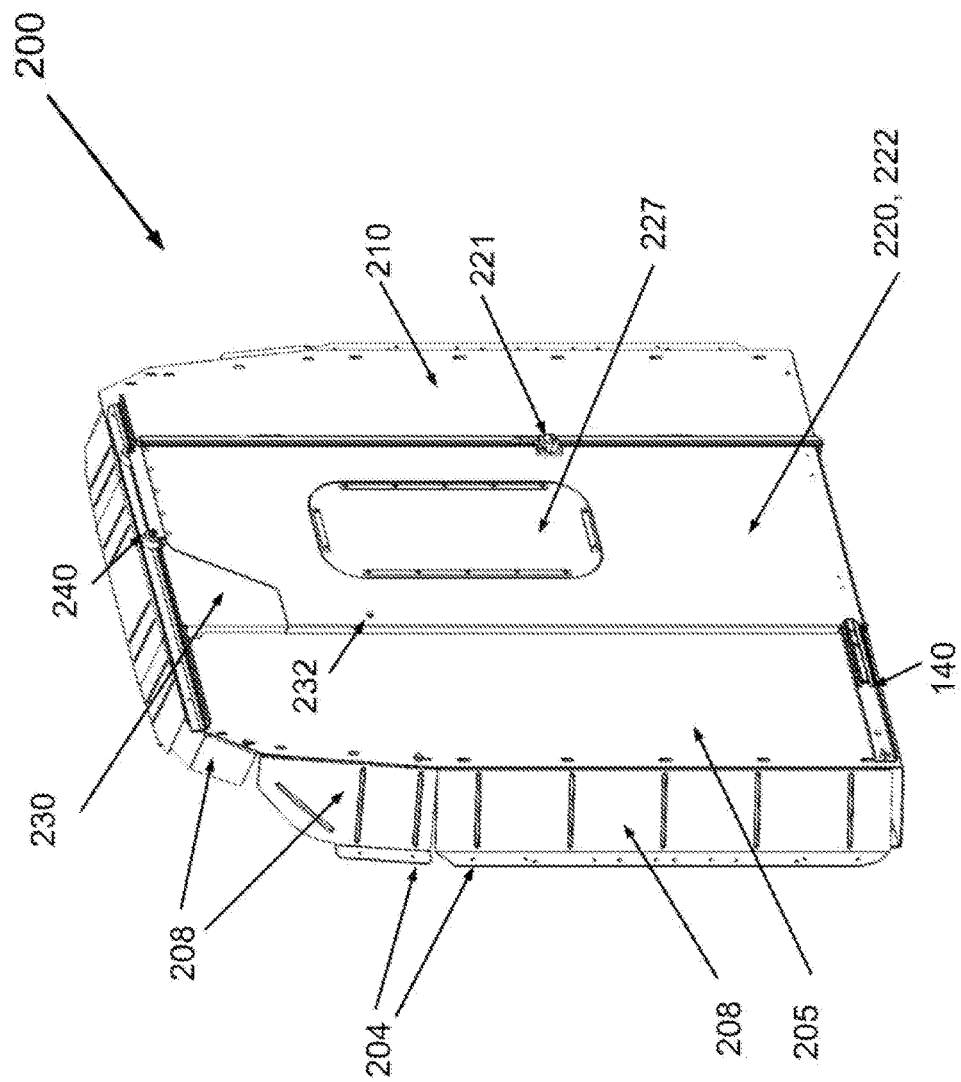
FIG. 9 is a rear, side perspective view of the vehicle partition assembly of FIG. 8, with a door of the assembly being in a closed position.
Figure 10:
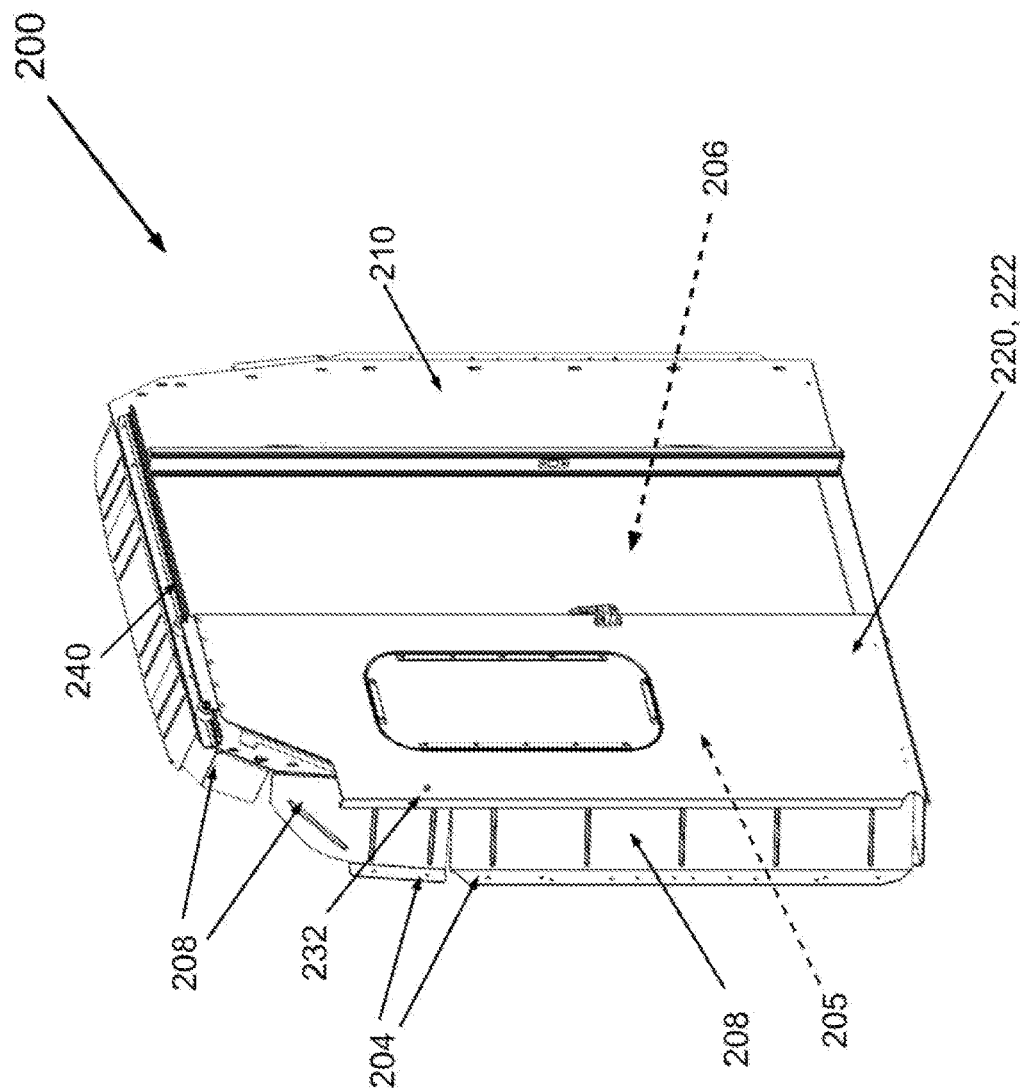
FIG. 10 is the rear, side perspective view of the vehicle partition assembly of FIG. 9, with the door being in an open position.
Figure 11:
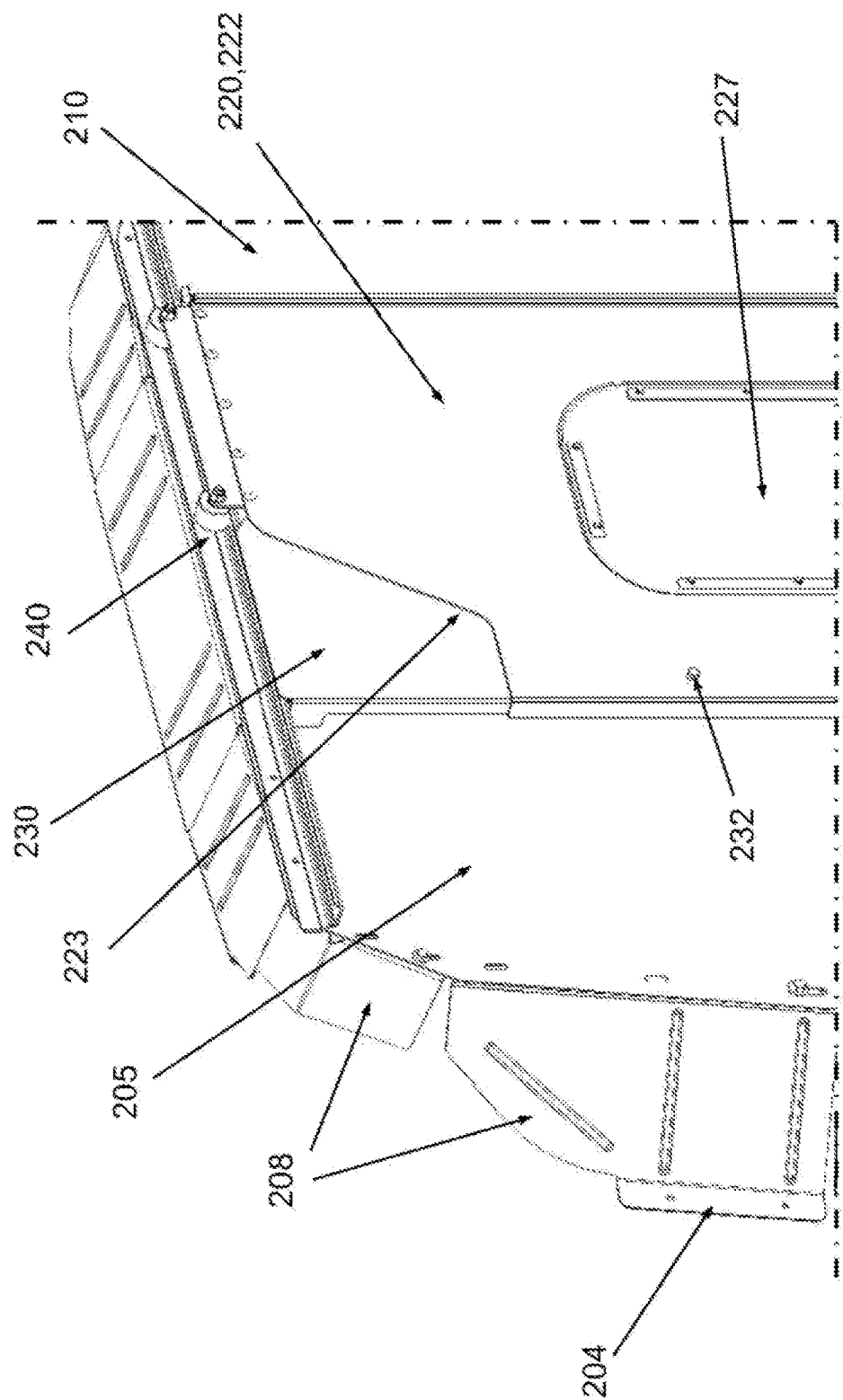
FIG. 11 is a close-up, partial view of the vehicle partition assembly of FIG. 8, with the door being in the closed position.

The partition 202 defines an opening 206 therein to allow a user of the vehicle (i.e. a driver and/or a passenger) to pass between the two portions of the vehicle separated by the partition assembly 200. The opening 206 is defined between one lateral edge of the wall 205 and another lateral edge of the wall 210. A top of the opening 206 is generally defined by the frame member 203; the opening 206 extends generally from the floor to the ceiling of the vehicle interior. In the embodiment of FIGS. 8 to 10, the opening 206 is offset from a lateral center of the partition 202, with the right wall 210 being narrower than the left wall 205. In some embodiments, it is contemplated that the right wall 210 could be wider than the left wall 205.

When in use, with the assembly 200 installed in the vehicle, the opening 206 is disposed generally between a driver seat and a passenger seat of the vehicle, although the opening 206 could overlap one or both of the seats. In some embodiments, the offset opening 206 may be used in a vehicle with no passenger seat, such that the opening 206 offset to the right of center may not overlap with any seating. This placement of the opening 206 permits passage of a driver or passenger from a front portion of the vehicle to a rear portion of the vehicle by passing between the driver and passenger seats, or by passing around the driver seat.

Figure 12:
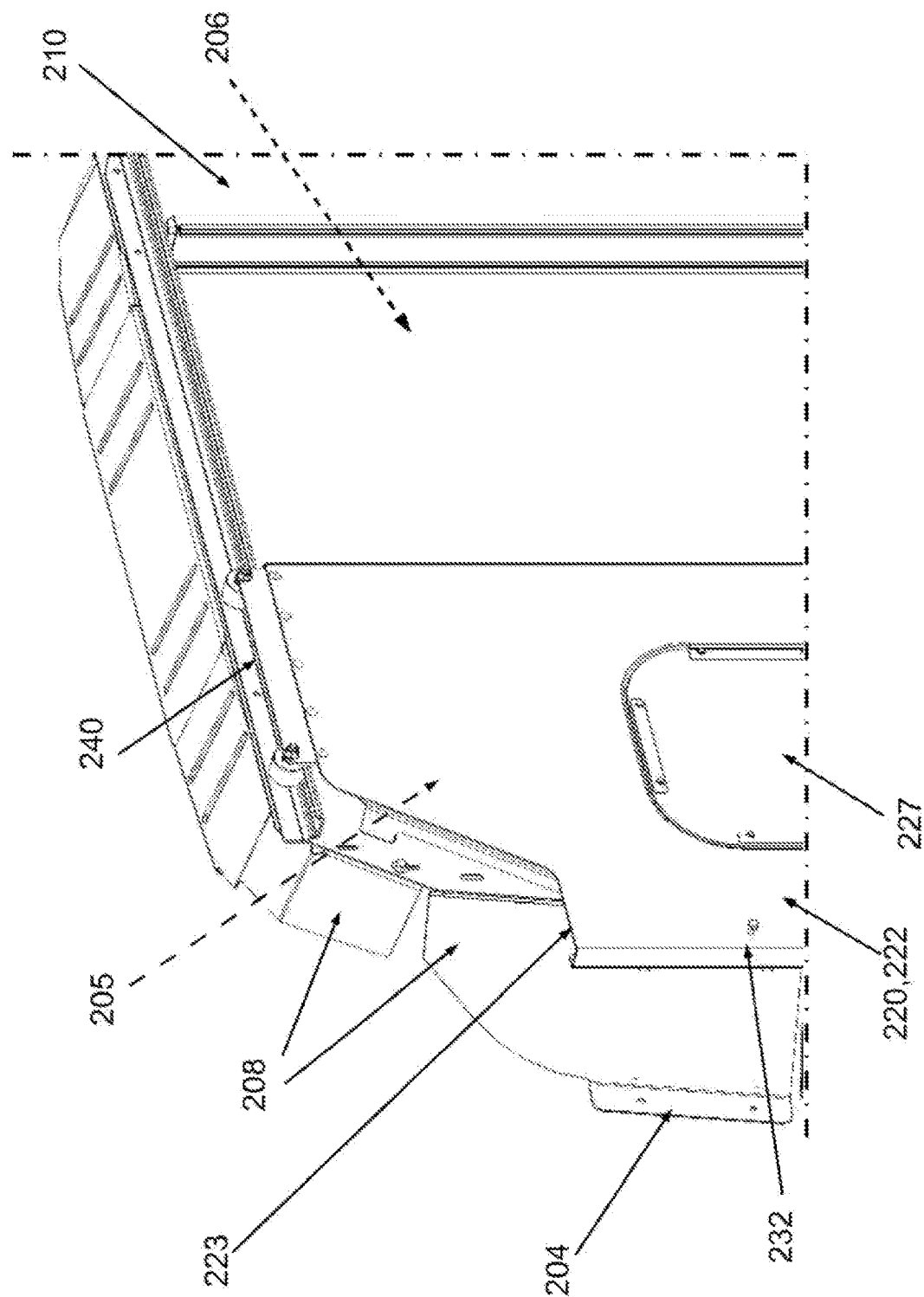
FIG. 12 is a close-up, partial view of the vehicle partition assembly of FIG. 8, with the door being in the open position.
Figure 13:
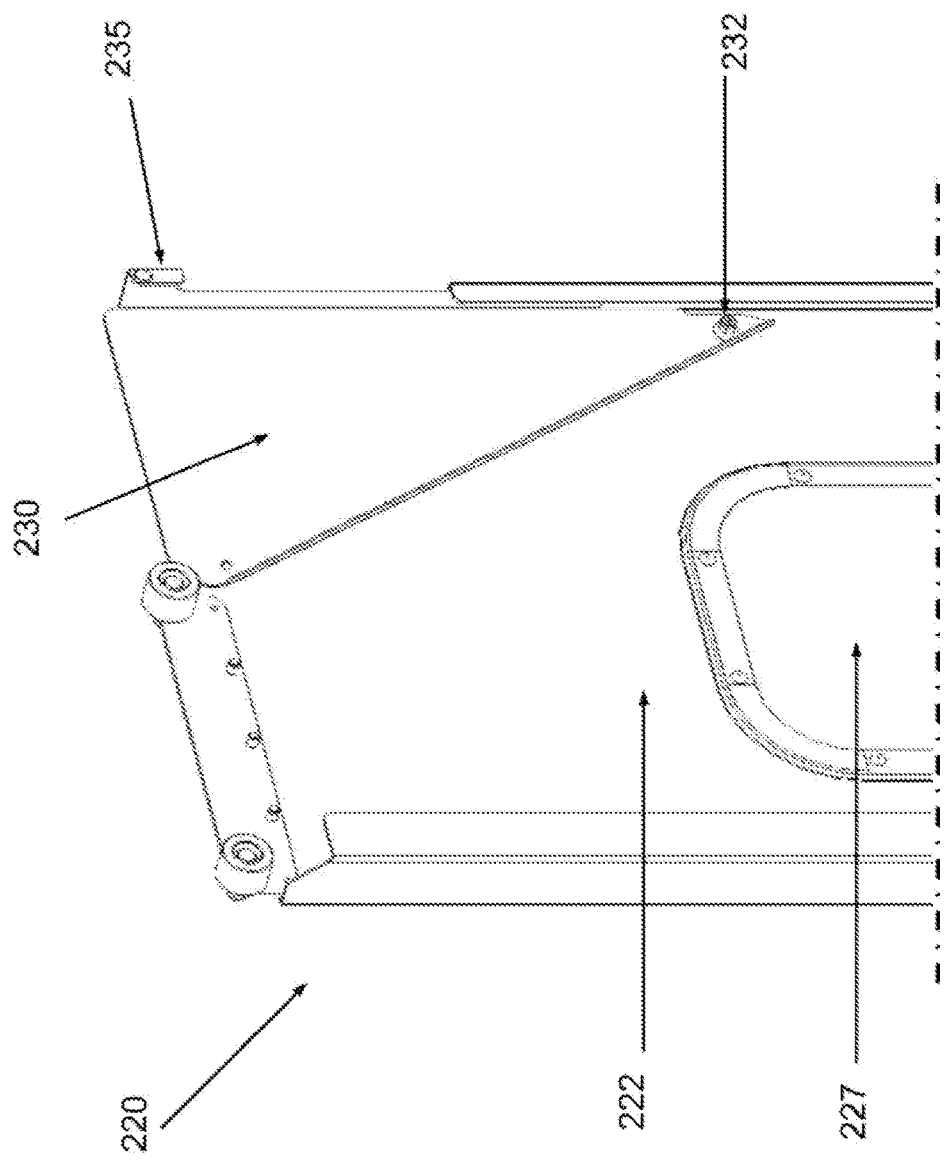
FIG. 13 is a front, side perspective view of the door of the vehicle partition assembly of FIG. 8, with a door panel of the door being in an extended position.
Figure 14:
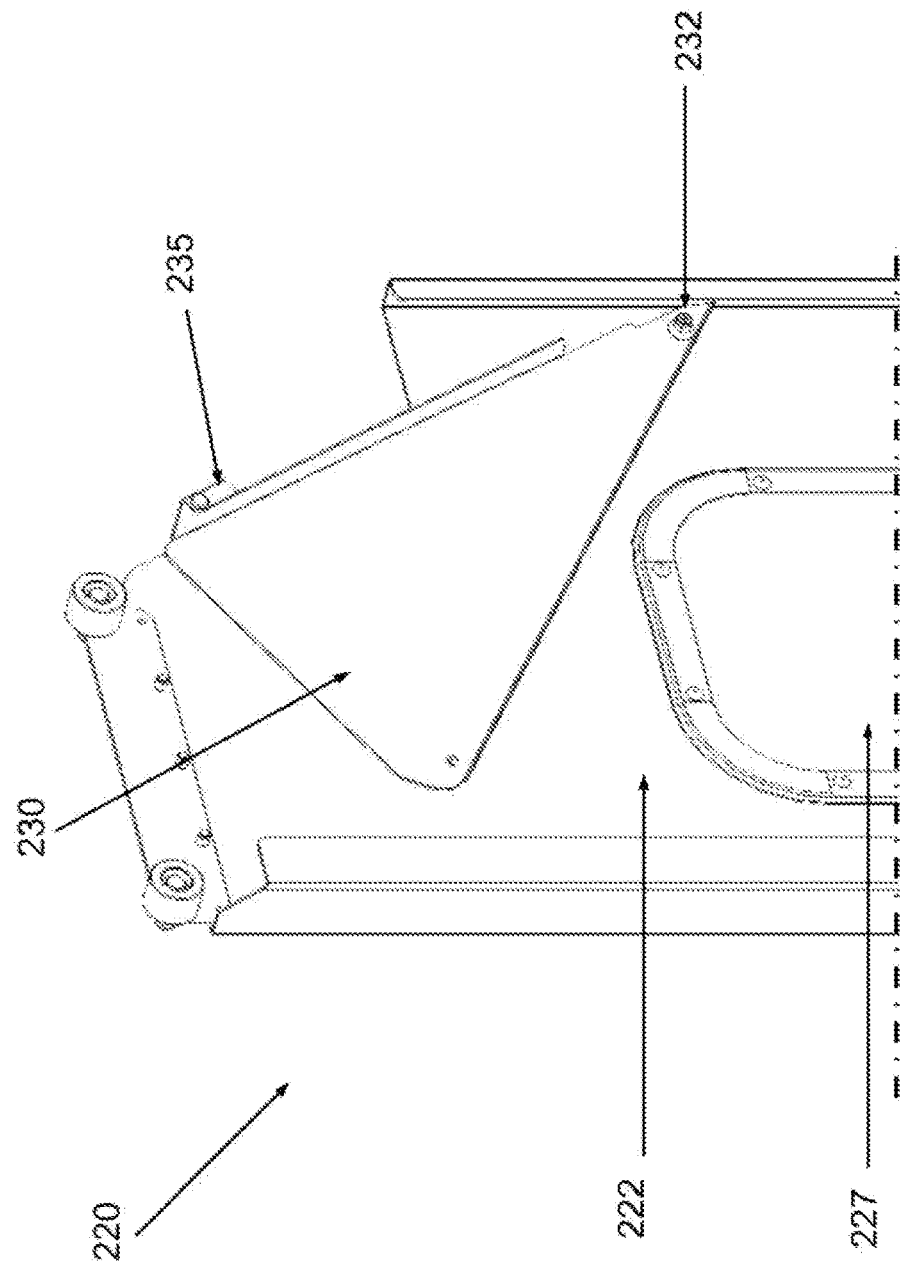
FIG. 14 is the front, side perspective view of the door of the vehicle partition assembly of FIG. 13, with the door panel being in a retracted position.

The vehicle partition assembly 200 includes a sliding door 220, also referred to as the door 220. The door 220 is moveably connected to the partition 202, specifically slidably connected thereto. In the illustrated embodiment, the door 220 is mounted on a rail guide 140 supporting a lower portion of the door 220 and an upper portion of the door 220 mounted to and supported by a roller and track assembly 240. The door 220 is selectively moveable between a closed position (FIGS. 8, 9, 11) and an open position (FIGS. 10, 12). In the closed position, the door 220 closes the opening 206, impeding passage of people and objects through the opening 106, as well as limiting noise transmission therethrough. In the open position, the door 220 overlaps the wall 205 while leaving the opening 206 uncovered, permitting the passage of people and objects therethrough. In at least some embodiments, the door 220 could also be positionable at any number of positions intermediate to the closed position and the open position.

The door 220 includes a door body 222 slidably connected to the partition 202. The door body 222 includes a door handle 221 for selectively opening a latch (not shown) which selectively maintains the door 220 in the closed position. In at least some embodiments, the same or different latch could be used to maintain the door 220 in the open position. Different mechanisms for locking the door 220 in place are contemplated.

The door 220 also includes a door panel 230 connected to and selectively moveable relative to the door body 222. While the door panel 130 of the assembly 100 is disposed on a rear side of the door 120, the door panel 230 is disposed on a forward side of the door body 222, the panel 230 being between the door body 22 and the partition 202. In the illustrated embodiment, the door body 222 also includes a window 227 connected therein.

The panel 230 is moveable between at least an extended position (FIGS. 8, 9, 11) and a retracted position (FIGS. 10, 12). With the door 220 in the closed position, the door panel 230 is in the extended position and the door 220 selectively closes the opening 206. With the door 220 in the open position, the door panel 230 is in the retracted position and the opening 206 is uncovered to allow passage of the user therethrough. Broadly, the panel 230 serves to selectively cover a cut-away of the door body 222, defined by an edge 223. The panel 230 and the door body 222 thus form a generally rectangular door shape in the closed position, while revealing the cutaway in the open position of the door 220.

The door panel 230 is more specifically pivotally connected to the door body 220. The panel 230 pivots about a pivot point 232, disposed in a bottom portion of the panel 130. In the illustrated embodiment, the pivot point 232 is formed by a fastener connecting the panel 230 to the door body (a nut and bolt in the present case), although different pivot mechanisms are contemplated. In the present embodiment, the pivot point 232 is spaced from the cutaway edge 223 of the door body 222. The specific position of the pivot of the panel 230 could vary. For the panel 230, the slot and rigid member arrangement has been omitted.

The door panel 230 also includes a flange 235 extending generally toward to the partition 202. The flange 235 is disposed along an exterior edge of the panel 230 (opposite the door body 222) and is arranged generally perpendicular to the face of the panel 230. When the assembly 200 is in use, installed in the vehicle, the flange 235 serves to bring the panel 230 from the retracted position to the extended position, as will be described below.

As with the panel 130, the door panel 230 serves to selectively cover a cutaway portion of the door body 222. More specifically, the door panel 230 permits an upper portion of the door 220 to adapt to different size requirements in the open and closed positions of the door 220. Generally, when the door 220 is moved from the closed position to the open position, contact between the door panel 230 and either the vehicle and/or the partition 202 causes the door panel 230 to move from the extended position to the retracted position. For example, the flange 235 could abut the vehicle wall or ceiling, thereby pushing the panel 230 into the retracted position. When the door 220 is moved from the open position to the closed position, contact between the flange 235 and the partition 202 cause the door panel 230 to move from the retracted position to the extended position. In the present embodiment, friction between an edge of the flange 235 and the surface of the partition 202 cause drag on the panel 230 as the door 220 is moved toward the closed position, causing the panel 230 to pivot out to the extended position. In at least some embodiments, it is contemplated that the partition 202 could include a fixed, rigid member (for example, a small post) against which the flange 235 could abut when the door 220 is near the closed position, thereby causing the panel 230 to pivot out to the extended position.

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

What is claimed is:

1. A vehicle partition assembly for installing in a vehicle, the assembly comprising:
    a partition configured to connect to an interior of the vehicle, the partition having an opening defined therein; and
    a door selectively moveable between at least an open position and a closed position, the door comprising:
        a door body slidably connected to the partition, and
        a door panel selectively moveable relative to the door body between at least an extended position and a retracted position, the door panel being pivotally connected to the door body,
    with the door being in the closed position:
        the door panel is in the extended position, and
        the door selectively closes the opening,
    with the door being in the open position:
        the door panel is in the retracted position, and
        the opening is uncovered to allow passage of a user therethrough.

2. The vehicle partition assembly of claim 1, wherein: the partition comprises:
    a first partition wall, and
    a second partition wall connected to the first partition wall; and
    the opening is defined between a first lateral edge of the first partition wall and a second lateral edge of the second partition wall.

3. The vehicle partition assembly of claim 2, wherein the partition further comprises a top partition wall connected to and extending between the first partition wall and the second partition wall.

4. The vehicle partition assembly of claim 1, wherein the door panel pivots about a pivot point adjacent to an edge of the door body.

5. The vehicle partition assembly of claim 1, wherein the door panel pivots about a pivot point spaced from an edge of the door body.

6. The vehicle partition assembly of claim 1, wherein:
    the door body has a slot defined therein;
    the door panel includes a rigid member extending from the door panel toward the door body; and
    the rigid member extends through the slot to guide pivoting motion of the door panel relative to the door body.

7. The vehicle partition assembly of claim 1, wherein, when in use, the opening is disposed laterally between a driver seat of the vehicle and a passenger seat of the vehicle, the opening permitting passage of a user from a front portion of the vehicle to a rear portion of the vehicle.

8. The vehicle partition assembly of claim 1, wherein the opening is defined in a lateral center of the partition.

9. The vehicle partition assembly of claim 1, further comprising at least one rail guide slidably connecting the door body to the partition.

10. The vehicle partition assembly of claim 9, wherein the at least one rail guide includes:
    an upper rail guide connecting an upper portion of the door body to the partition; and
    a lower rail guide connecting a lower portion of the door body to the partition.

11. The vehicle partition assembly of claim 9, further comprising:
    a roller and track assembly connecting an upper portion of the door body to the partition; and
    wherein the at least one rail guide connects a lower portion of the door body to the partition.

12. The vehicle partition assembly of claim 1, wherein a distance from a top corner of the opening to a lateral edge of the partition is less than a width of the opening.

13. The vehicle partition assembly of claim 1, wherein the door body comprises a window connected therein.

14. The vehicle partition assembly of claim 1, wherein the door is generally rectangular when in the closed position.

15. A vehicle partition assembly for installing in a vehicle, the assembly comprising:
    a partition configured to connect to an interior of the vehicle, the partition having an opening defined therein; and
    a door selectively moveable between at least an open position and a closed position, the door comprising:
        a door body slidably connected to the partition, and
        a door panel selectively moveable relative to the door body between at least an extended position and a retracted position,
    with the door being in the closed position:
        the door panel is in the extended position, and
        the door selectively closes the opening,
    with the door being in the open position:
        the door panel is in the retracted position, and
        the opening is uncovered to allow passage of a user therethrough, wherein:
the door panel includes a flange extending generally toward to the partition; and
when in use and when the door is being moved from the open position to the closed position, contact between the flange and the partition cause the door panel to move from the retracted position to the extended position.

16. A vehicle partition assembly for installing in a vehicle, the assembly comprising:
a partition configured to connect to an interior of the vehicle, the partition having an opening defined therein; and
a door selectively moveable between at least an open position and a closed position, the door comprising:
a door body slidably connected to the partition, and
a door panel selectively moveable relative to the door body between at least an extended position and a retracted position,
with the door being in the closed position:
the door panel is in the extended position, and
the door selectively closes the opening,
with the door being in the open position:
the door panel is in the retracted position, and
the opening is uncovered to allow passage of a user therethrough,
wherein, when in use and when the door is being moved from the closed position to the open position, contact between the door panel and at least one of the vehicle and the partition cause the door panel to move from the extended position to the retracted position.

\* \* \* \* \*